(12) United States Patent
Chen et al.

(10) Patent No.: US 12,282,369 B1
(45) Date of Patent: Apr. 22, 2025

(54) POWER-OFF PROTECTION METHOD AND APPARATUS, DEVICE, AND STORAGE MEDIUM

(71) Applicant: Suzhou MetaBrain Intelligent Technology Co., Ltd., Suzhou (CN)

(72) Inventors: Hung Hsin Chen, Suzhou (CN); Bo Hsiung Chi, Suzhou (CN); Yen Cheng Lu, Suzhou (CN)

(73) Assignee: Suzhou MetaBrain Intelligent Technology Co., Ltd., Suzhou (CN)

( * ) Notice: Subject to any disclaimer, the term of this patent is extended or adjusted under 35 U.S.C. 154(b) by 0 days.

(21) Appl. No.: 18/859,048

(22) PCT Filed: Jun. 16, 2023

(86) PCT No.: PCT/CN2023/100672
§ 371 (c)(1),
(2) Date: Oct. 22, 2024

(87) PCT Pub. No.: WO2024/139076
PCT Pub. Date: Jul. 4, 2024

(30) Foreign Application Priority Data

Dec. 28, 2022 (CN) .......................... 202211692582.5

(51) Int. Cl.
*G06F 1/28* (2006.01)
(52) U.S. Cl.
CPC ...................................... *G06F 1/28* (2013.01)
(58) Field of Classification Search
CPC ....................................................... G06F 1/28
See application file for complete search history.

(56) References Cited

U.S. PATENT DOCUMENTS

| 2012/0106565 A1 | 5/2012 | Yousefi et al. |
| 2012/0173905 A1 | 7/2012 | Diab et al. |

(Continued)

FOREIGN PATENT DOCUMENTS

| CN | 104954145 A | 9/2015 |
| CN | 106506172 A | 3/2017 |

(Continued)

OTHER PUBLICATIONS

International Search Report and Written Opinion of corresponding PCT Application No. PCT/CN2023/100672 dated Sep. 12, 2023 including English translations (16 pages).

(Continued)

*Primary Examiner* — Zahid Choudhury
(74) *Attorney, Agent, or Firm* — Crowell & Moring LLP (57) ABSTRACT

The present application relates to a power-off protection method and apparatus, a device, and a storage medium. The main technical solution includes: in response to power sourcing equipment (PSE) being about to stop supplying power to a power device (PD) within a predetermined time, sending a first link layer discovery protocol (LLDP) message to the PD; receiving a second LLDP message, which is replied by the PD according to the first LLDP message; and powering off the PD according to the second LLDP message. The present application can not only avoid the interruption of the current tasks of a PD as much as possible, but can also record power-off reasons, so as to facilitate tracing to maintain the normal operation of a device, thereby ensuring the security of data and the device.

20 Claims, 5 Drawing Sheets

(56) References Cited

U.S. PATENT DOCUMENTS

| | | | | |
|---|---|---|---|---|
| 2012/0216056 | A1* | 8/2012 | Schindler | H04L 12/10 |
| | | | | 713/320 |
| 2018/0167223 | A1* | 6/2018 | Pratap | H04L 12/10 |
| 2020/0233474 | A1* | 7/2020 | Alcorn | G06F 1/28 |
| 2022/0011841 | A1* | 1/2022 | Wee | G06F 1/30 |

FOREIGN PATENT DOCUMENTS

| | | |
|---|---|---|
| CN | 113632423 A | 11/2021 |
| CN | 115695060 A | 2/2023 |

OTHER PUBLICATIONS

Search report of corresponding CN Priority Application No. CN202211692582.5 Dated Feb. 3, 2023 (2 pages).
First Office Action of corresponding CN Priority Application No. CN202211692582.5 dated Feb. 6, 2023, including English translation (12 pages).
Supplementary Search report of corresponding CN Priority Application CN202211692582.5 dated Feb. 23, 2023 (2 pages).
Notification to Grant Patent Right for Invention of corresponding CN Priority Application No. CN202211692582.5 dated Feb. 25, 2023 including English translation, and including English translation of allowed claims of corresponding CN Priority Application No. CN202211692582.5 (11 pages).

\* cited by examiner

| Type | Length | Data |
|---|---|---|
| Power-off notification | 30 | Powering off PSE, a default time: 60 |

POWER-OFF PROTECTION METHOD AND APPARATUS, DEVICE, AND STORAGE MEDIUM

CROSS-REFERENCE TO RELATED APPLICATIONS

This application is the national phase application of International Patent Application No. PCT/CN2023/100672, filed Jun. 16, 2023, which claims priority to Chinese Patent Application No. 202211692582.5, entitled "POWER-OFF PROTECTION METHOD AND APPARATUS, DEVICE, AND STORAGE MEDIUM", filed to China National Intellectual Property Administration on Dec. 28, 2022. The contents of International Patent Application No. PCT/CN2023/100672 and Chinese Patent Application No. 202211692582.5 are each incorporated by reference herein in their entireties.

FIELD

The present application relates to the technical field of Power over Ethernet (POE), and particularly to a power-off protection method and apparatus, a device, and a storage medium.

BACKGROUND

The PoE is a technology that may transmit power and data to apparatuses through twisted pair wires in Ethernet. A complete PoE system includes power sourcing equipment (PSE) and a power device (PD).

Under the normal operation of the PoE system, when the PSE must actively stop supplying power to the PD due to some factors, the PSE directly stops supplying power to the PD, causing the PD to be too late to perform device protection measures, which not only leads to software system or hardware damage, but also fails to record power-off reasons, making it difficult to ensure the security of data and the device.

SUMMARY

Based on this, the present application provides a power-off protection method and apparatus, a device, and a storage medium, which can inform a PD that the power supply is about to be stopped in advance, avoid the interruption of current tasks of the PD as much as possible, and meanwhile, record power-off reasons, so as to facilitate tracing to maintain the normal operation of a device, thereby ensuring the security of data and the device.

According to a first aspect, the present application provides a power-off protection method, which is applied to PSE and includes:

in response to the PSE being about to stop supplying power to a PD within a predetermined time, sending a first link layer discovery protocol (LLDP) message to the PD;

receiving a second LLDP message, which is replied by the PD according to the first LLDP message; and powering off the PD according to the second LLDP message.

In one implementation, the second LLDP message includes a required shutdown time and shutdown delay information of the PD; the powering off the PD according to the second LLDP message includes:

determining whether to delay powering off the PD according to the shutdown delay information; and powering off the PD according to the required shutdown time when it is determined to delay powering off the PD.

In one implementation, the determining whether to delay powering off the PD according to the shutdown delay information includes:

determining whether to delay powering off the PD by matching the shutdown delay information with pre-stored shutdown information.

In one implementation, the pre-stored shutdown information includes multiple pieces of delay information and non-delay information; the determining whether to delay powering off the PD by matching the shutdown delay information with pre-stored shutdown information includes:

if the shutdown delay information matches at least one piece of delay information in the pre-stored shutdown information, determining to delay powering off the PD;

if the shutdown delay information matches at least one piece of non-delay information in the pre-stored shutdown information, determining to power off the PD in advance; and if the shutdown delay information does not match any delay information and non-delay information in the pre-stored shutdown information, determining to power off the PD normally.

In one implementation, the method further includes:

starting a default time timer to time the predetermined time for the PSE to stop supplying power to the PD after sending the first LLDP message to the PD.

In one implementation, the powering off the PD according to the required shutdown time includes: turning off the default time timer to stop timing the predetermined time; and starting a delay time timer, and after the required shutdown time has elapsed, stopping the delay time timer, and powering off the PD.

In one implementation, the method further includes:

when it is determined to power off the PD normally, after the predetermined time has elapsed, stopping the default time timer, and powering off the PD.

In one implementation, the in response to the PSE being about to stop supplying power to a PD within a predetermined time, sending a first LLDP message to the PD includes:

in response to the PSE actively stopping supplying power to the PD within the predetermined time, acquiring mapping information between ports of the PSE and the PD; and sending the first LLDP message to a PD corresponding to a port with a lowest priority based on a preset port priority and the mapping information.

In one implementation, the PSE actively stopping supplying power to the PD within the predetermined time includes:

detecting power consumption amounts of at least one PD connected to the PSE; and the PSE actively stopping supplying power to the PD within the predetermined time when a sum of the power consumption amounts of the at least one PD is greater than a power supply amount of the PSE.

In one implementation, the in response to the PSE being about to stop supplying power to a PD within a predetermined time, sending a first LLDP message to the PD includes:

in response to the PSE stopping supplying power to the PD within the predetermined time according to a user instruction, acquiring mapping information between ports of the PSE and the PD; and sending the first LLDP message to a PD corresponding to a target port in the user instruction according to the mapping information.

In one implementation, the first LLDP message includes a power-off type length value (TLV).

In one implementation, the PSE includes a switch.

According to a second aspect, the present application provides a power-off protection apparatus, which is applied to PSE and includes:

a first sending module, configured to in response to the PSE being about to stop supplying power to a PD within a predetermined time, send a first LLDP message to the PD;

a first receiving module, configured to receive a second LLDP message, which is replied by the PD according to the first LLDP message; and a power-off module, configured to power off the PD according to the second LLDP message.

According to a third aspect, the present application provides a computer device, including:

at least one processor; and a memory communicatively connected to the at least one processor, where the memory stores computer instructions executable by the at least one processor, and the computer instructions, when executed by the at least one processor, enable the at least one processor to perform the method according to the above-mentioned first aspect.

According to a fourth aspect, the present application provides a non-volatile computer-readable storage medium having stored thereon computer instructions for causing a computer to perform the method according to the above-mentioned first aspect.

According to the technical contents provided by the embodiment of the present application, in response to the PSE being about to stop supplying power to the PD within the predetermined time, the first LLDP message is sent to the PD. The second LLDP message, which is replied by the PD according to the first LLDP message, is received. The PD is powered off according to the second LLDP message. Therefore, the present application can not only avoid the interruption of the current tasks of the PD as much as possible, but can also record power-off reasons, so as to facilitate tracing to maintain the normal operation of a device, thereby ensuring the security of data and the device.

According to a fifth aspect, the present application provides a power-off protection method, which is applied to a PD and includes:

receiving a first LLDP message sent by PSE, where the first LLDP message is used for informing the PD that the PSE stops supplying power to the PD within a predetermined time;

determining reply information of the PD according to the first LLDP message and process information of a currently executed task of the PD;

generating a second LLDP message according to the reply information; and sending the second LLDP message to the PSE, whereby the PSE powers off the PD according to the second LLDP message.

In one implementation, the first LLDP message includes a power-off TLV, and the process information includes a process remaining time; the determining reply information of the PD according to the first LLDP message and process information of a currently executed task of the PD includes:

determining that the reply information of the PD is delaying powering off when a predetermined time in the power-off TLV is less than the process remaining time.

In one implementation, the generating a second LLDP message according to the reply information includes:

acquiring shutdown delay information and required shutdown time of delaying powering off the PD; and generating the second LLDP message according to the shutdown delay information and the required shutdown time.

In one implementation, the method further includes:

determining that the reply information of the PD is powering off normally when the predetermined time in the power-off TLV is greater than the process remaining time.

In one implementation, the process information further includes a process name; the generating a second LLDP message according to the reply information includes:

generating the second LLDP message according to the process name and the process remaining time when the PD is normally powered off.

In one implementation, the method further includes:

saving power-off reason information in the first LLDP message after receiving the first LLDP message sent by the PSE.

According to a sixth aspect, the present application provides a power-off protection apparatus, which is applied to a PD and includes:

a second receiving module, configured to receive a first LLDP message sent by PSE, where the first LLDP message is used for informing the PD that the PSE stops supplying power to the PD within a predetermined time;

a determination module, configured to determine reply information of the PD according to the first LLDP message and process information of a currently executed task of the PD;

a generation module, configured to generate a second LLDP message according to the reply information; and a second sending module, configured to send the second LLDP message to the PSE, whereby the PSE powers off the PD according to the second LLDP message.

According to a seventh aspect, the present application provides a computer device, including:

at least one processor; and a memory communicatively connected to the at least one processor, where the memory stores computer instructions executable by the at least one processor, and the computer instructions, when executed by the at least one processor, enable the at least one processor to perform the method according to the above-mentioned fifth aspect.

According to an eighth aspect, the present application provides a non-volatile computer-readable storage medium having stored thereon computer instructions for causing a computer to perform the method according to the above-mentioned fifth aspect.

According to the technical contents provided by the embodiment of the present application, the first LLDP message sent by the PSE is received. The reply information of the PD is determined according to the first LLDP message and the process information of the currently executed task of the PD. The second LLDP message is generated according to the reply information. The second LLDP message is sent to the PSE, whereby the PSE powers off the PD according to the second LLDP message. Therefore, the present application can avoid the interruption of the current tasks of the PD as much as possible, thereby ensuring the security of data and the device.

DETAILED DESCRIPTION

The present application is further described in detail below in conjunction with the accompanying drawings and embodiments. It is to be understood that the specific embodiments described herein are for the sole purpose of explaining the present application and are not intended to limit the present application.

Figure 1:
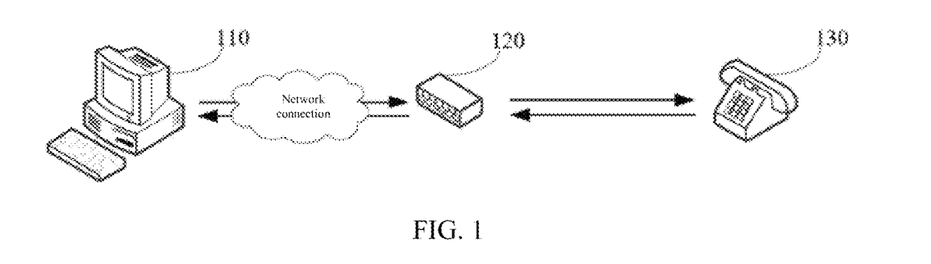
FIG. 1 is an application environment diagram of a power-off protection method according to an embodiment.

For ease of understanding, a system to which the present application applies will first be described. The power-off protection method provided by the present application may be applied to a system architecture as shown in FIG. 1. A terminal 110 is communicated with PSE 120 through a network, and the PSE 120 is connected to a PD 130 through a twisted pair wire. When the PSE 120 is about to stop supplying power to the PD 130 within a predetermined time, a first LLDP message is sent to the PD 130. The PD 130 receives the first LLDP message sent by the PSE 120. The first LLDP message is used for informing the PD 130 that the PSE stops supplying power to the PD 130 within the predetermined time. Reply information of the PD 130 is determined according to the first LLDP message and process information of a currently executed task of the PD 130. A second LLDP message is generated according to the reply information and sent to the PSE 120. The PSE 120 receives the second LLDP message, which is replied by the PD according to the first LLDP message, and powers off the PD 130 according to the second LLDP message.

A user may set reasons for allowing the PSE 120 to delay powering off and priorities of ports of the PSE 120 through the terminal 110. The terminal 110 may be, but is not limited to, various personal computers, notebook computers, smartphones, and tablet computers. The PSE 120 may be a switch, a router, or other network switching devices, and the PD 130 may be an Internet phone, a network camera, a sensor, etc., without limitation.

Figure 2:
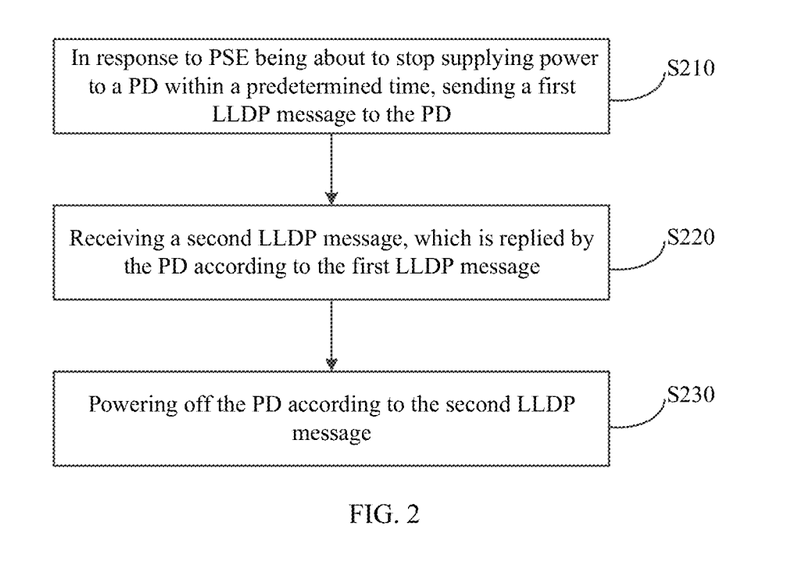
FIG. 2 is a schematic flowchart of a power-off protection method according to an embodiment.

FIG. 2 is a flowchart of a power-off protection method provided by an embodiment of the present application. The method may be performed by the PSE 120 in the system shown in FIG. 1. As shown in FIG. 2, the method may include the following steps.

At S210, in response to the PSE being about to stop supplying power to a PD within a predetermined time, a first LLDP message is sent to the PD.

When the PSE detects that a power consumption amount of the PD is more than its own power supply amount, or a user inputs an instruction to stop supplying power to a PD through the terminal, the PSE will stop supplying power to the PD within the predetermined time. Meanwhile, the first LLDP message is sent to the PD to inform that the PD is about to be powered off. The predetermined time may be set according to the user's requirements and is not limited herein.

The LLDP may organize information of a local device into a TLV, which is encapsulated in a link layer discovery protocol data unit (LLDPDU) and sent to other directly connected neighboring devices. Meanwhile, the LLDPDU received from the neighboring device is also saved in the form of a standard management information base (MIB). The device may save and manage the information of itself and directly connected neighboring devices through the LLDP for a network management system to query and determine the communication status of the link.

The first LLDP message includes a power-off TLV, and the power-off TLV includes a type byte, a length byte, and a data byte. The type byte defines an attribute type of the power-off TLV for notifying the PD that it is about to be powered off. The length byte is used for indicating the length of the data byte, and the data byte is used for indicating the predetermined time and a power-off reason.

Figure 3:
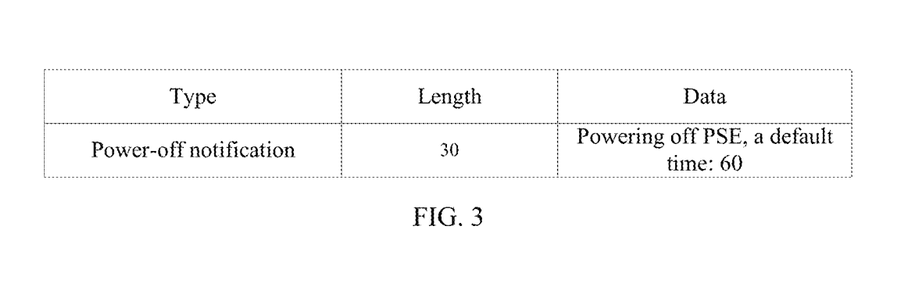
FIG. 3 is a schematic diagram of a format of a power-off TLV according to an embodiment.

The type byte, length byte, and data byte of the power-off TLV may be represented in the form shown in FIG. 3. As shown in FIG. 3, the type byte of the power-off TLV indicates that the power-off TLV is a power-off notification, which may be defined as POWER_SHUTDOWN_NOTIFY. The length byte is 30, indicating that the length of the data byte is 30. The data byte indicates that the reason for powering off is that the PSE is powered off, and powering off occurs after 60 s by default, which may be defined as PSE power off, default_time: 60.

At S220, a second LLDP message, which is replied by the PD according to the first LLDP message, is received.

After receiving the first LLDP message, the PD determines whether a current task can be completed within the predetermined time according to the execution condition of the current task. If the current task may be completed within the predetermined time, relevant information of normally powering off is replied to the PSE and sent to the PSE in the form of the LLDP message. If the current task cannot be completed within the predetermined time, the delay reason and delay time shall be reported to the PSE and sent to the PSE in the form of the LLDP message.

The second LLDP message includes a reply TLV, and the reply TLV includes a type byte, a length byte, and a data byte. The type byte defines an attribute type of the reply TLV for replying whether the PSE is normally powered off. The length byte is used for indicating the length of the data byte, and the data byte is used for indicating a power-off time and a power-off reason. It is to be noted that the power-off time and the power-off reason may indicate the time and the reason for normally powering off or may indicate the time and the reason for delaying powering off.

Figure 4:
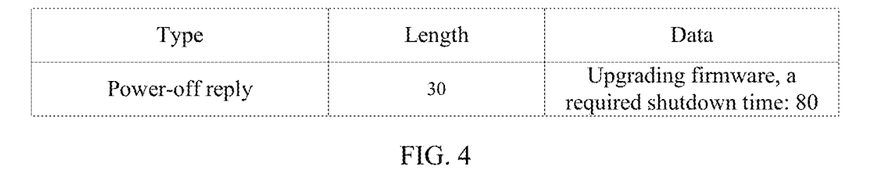
FIG. 4 is a schematic diagram of a format of a reply TLV according to an embodiment.

The type byte, length byte, and data byte of the reply TLV may be represented in the form shown in FIG. 4, which is a reply TLV that delays powering off. As shown in FIG. 4, the type byte of the reply TLV indicates that the reply TLV is a power-off reply, which may be defined as POWER_SHUTDOWN_RESP. The length byte is 30, indicating that the length of the data byte is 30. The data byte indicates that the reason for delaying powering off is upgrading firmware, and a required shutdown time is 80 s, which may be defined as upgrade firmware, need_time: 80.

The PD generates the second LLDP message and then sends it to the PSE, and the PSE receives the second LLDP message to perform subsequent power-off processing.

At S230, the PD is powered off according to the second LLDP message.

If the PSE determines that the PD may be normally powered off according to the second LLDP message, the PD is powered off after a preset time. If the PSE determines that powering off the PD needs to be delayed according to the second LLDP message, it is determined whether the reason for delaying powering off replied by the PD is allowed, and if so, the PD is powered off after the required shutdown time, and if not, the PD is powered off after the preset time.

It can be seen that in the embodiments of the present application, in response to the PSE being about to stop supplying power to the PD within the predetermined time, the first LLDP message is sent to the PD. The second LLDP message, which is replied by the PD according to the first LLDP message, is received. The PD is powered off according to the second LLDP message. Therefore, the present application can not only avoid the interruption of the current tasks of the PD as much as possible, but can also record power-off reasons, so as to facilitate tracing to maintain the normal operation of a device, thereby ensuring the security of data and the device.

The steps in the above method flow are described in detail below. The above-mentioned S210, i.e., "in response to the PSE being about to stop supplying power to a PD within a predetermined time, sending a first LLDP message to the PD", is first described in detail with reference to the embodiments.

As one implementation, in response to the PSE actively stopping supplying power to the PD within the predetermined time, mapping information between ports of the PSE and the PD is acquired.

The first LLDP message is sent to a PD corresponding to a port with a lowest priority based on a preset port priority and the mapping information.

When the PSE detects that the power consumption amount of the PD is more than its own power supply amount, the PSE actively stops supplying power to the PD within the predetermined time. A method for the PSE actively stopping supplying power to the PD within the predetermined time includes: detecting power consumption amounts of at least one PD connected to the PSE; and the PSE actively stopping supplying power to the PD within the predetermined time when a sum of the power consumption amounts of the at least one PD is greater than a power supply amount of the PSE.

The twisted pair wire connecting the PSE and the PD include eight cables, four for network communication and four for power supply. The port of the PSE is connected to at least one PD, and the PSE detects the power consumption amount of each PD. Real-time detection or timed detection may be performed according to a specific application scenario. When the sum of the power consumption amounts of at least one PD is greater than the power supply amount of the PSE, it indicates that the PSE cannot satisfy the normal power consumption of each PD, and in order to ensure the normal use of most PDs, the PSE actively stops supplying power to the PD within the predetermined time.

When the PSE determines that it is necessary to actively stop supplying power to the PD within the predetermined time, it is necessary to further determine to stop supplying power to which PD due to the different uses of the PDs for the user.

When each port of the PSE is connected to the PD, a corresponding relationship between the port and the PD is recorded to obtain the mapping information between the port of the PSE and the PD. The mapping information may be saved in the PSE or in the terminal, and the PSE may acquire the mapping information between the ports of the PSE and the PD from the terminal or a module thereof.

The first LLDP message is sent to the PD corresponding to the port with the lowest priority according to the mapping information based on the preset port priority.

The preset port priority is an order in which the user sets the priority use of the ports of the PSE in advance through the terminal. The port with the lowest priority is determined through the preset port priority, then the PD corresponding to the port is searched according to the mapping information, and the first LLDP message is sent to the PD.

As one implementation, in response to the PSE stopping supplying power to the PD within the predetermined time according to a user instruction, the mapping information between the ports of the PSE and the PD is acquired.

The first LLDP message is sent to a PD corresponding to a target port in the user instruction according to the mapping information.

When the user uses multiple PDs, if it is found that a PD or certain PDs are used less frequently or consume too much energy, the user needs to temporarily shut down the PD(s). The user instruction is sent to the PSE through the terminal, in which the user instruction specifies that the port corresponding to the PD needs to be shut down, i.e., the target port. After receiving the user instruction, the PSE acquires the target port in the user instruction, determines the PD corresponding to the target port according to the mapping information, and sends the first LLDP message to the PD.

The above-mentioned S230, i.e., "powering off the PD according to the second LLDP message", is described in detail below with reference to the embodiments.

As one implementation, S230 specifically includes: determining whether to delay powering off the PD according to the shutdown delay information; and powering off the PD according to the required shutdown time when it is determined to delay powering off the PD.

The second LLDP message includes a required shutdown time and shutdown delay information of the PD. The required shutdown time is the time required for the PD to complete the current task and shut down normally, and it is acquired from the data byte of the reply TLV. The shutdown delay information includes a reason for delaying shutting down the PD, such as the upgrading firmware shown in FIG. 4.

It is determined whether to delay powering off the PD according to the reason for delaying shutting down the PD. Specifically, it is determined whether to delay powering off the PD by matching the shutdown delay information with pre-stored shutdown information.

The pre-stored shutdown information is the reason why the user allows the PSE preset by the terminal to delay powering off and to power off in advance, for example, upgrading firmware, accessing system files, writing flash memory, and playing audio. The pre-stored shutdown information includes multiple pieces of byte information corresponding to the reason for delaying powering off, i.e., the delay information, and multiple pieces of byte information corresponding to the reason for powering off in advance, i.e., the non-delay information.

It is determined whether to delay powering off the PD by matching the shutdown delay information with the pre-stored shutdown information. If the shutdown delay information matches at least one piece of delay information in the pre-stored shutdown information, it is indicated that the reason for delaying powering off of the PD is a reason allowed by the PSE, and it is determined to delay powering off the PD. If the shutdown delay information matches at least one piece of non-delay information in the pre-stored shutdown information, it is indicated that the reason for delaying powering off of the PD is not the reason for delaying powering off allowed by the PSE and complies with the reason for powering off in advance, and it is determined to power off the PD in advance. If the shutdown delay information does not match any delay information and non-delay information in the pre-stored shutdown information, it is indicated that the reason for delaying powering off of the PD is not the reason for delaying powering off allowed by the PSE, nor complies with the reason for powering off in advance, and it is determined to power off the PD normally.

The necessary task execution can be guaranteed to be completed by determining whether to delay powering off the PD so that the PD takes protective measures to improve the security of data and the device. Meanwhile, a PD executing unnecessary tasks is normally powered off to ensure the power supply stability as much as possible.

As one implementation, a default time timer is started to time the predetermined time for the PSE to stop supplying power to the PD after sending the first LLDP message to the PD.

After sending the first LLDP message to the PD, the PSE starts the default time timer immediately to begin timing the predetermined time. If the PSE is allowed to delay powering off the PD, the default time timer is turned off, and the timing for the predetermined time is stopped. A delay time timer is started, and the timing for the required shutdown time is restarted to provide the PD sufficient time to process the current task. After the required shutdown time has elapsed, the delay time timer is stopped, and the PSE stops supplying power to the PD.

If the PSE normally powers off the PD, it is continued to time according to the predetermined time. After the predetermined time has elapsed, the default time timer is stopped, and the PSE powers off the PD.

Figure 5:
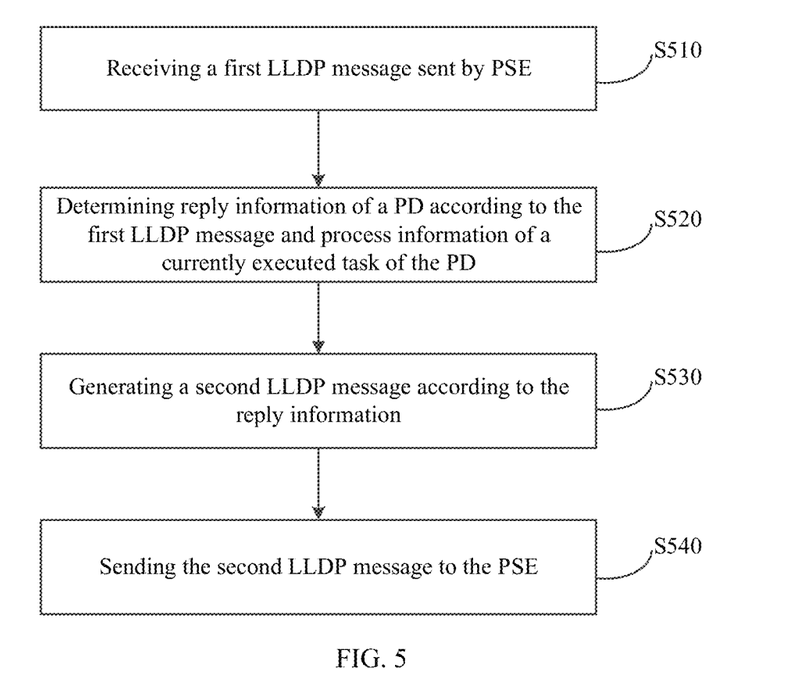
FIG. 5 is a schematic flowchart of a power-off protection method according to another embodiment.

FIG. 5 is a flowchart of another power-off protection method provided by an embodiment of the present application. The method may be performed by the PD 130 in the system shown in FIG. 1. As shown in FIG. 5, the method may include the following steps.

At S510, a first LLDP message sent by PSE is received.

When the PSE detects that a power consumption amount of the PD is more than its own power supply amount, or a user inputs an instruction to stop supplying power to a PD through the terminal, the PSE will stop supplying power to the PD within a predetermined time. At this time, the PSE generates the first LLDP message according to the predetermined time and a power-off reason and sends the first LLDP message to the PD so as to inform the PD that power supply will be stopped within the predetermined time.

The first LLDP message includes the power-off TLV as shown in FIG. 3, and reference may be made to the description of the power-off TLV in S210 for details, and the description thereof will not be repeated here.

The PD receives the first LLDP message and extracts the predetermined time and the power-off reason to respond to the PSE, avoiding interruption of an important task.

At S520, reply information of the PD is determined according to the first LLDP message and process information of a currently executed task of the PD.

The process information may include a process name and a process remaining time. The reply information may include delaying powering off and powering off normally. It can be determined whether to delay powering off the PD or normally power off the PD by comparing the predetermined time in the first LLDP message with the process remaining time.

At S530, a second LLDP message is generated according to the reply information.

The contents of the second LLDP messages generated corresponding to different reply information are also different. If the reply information is delaying powering off, the second LLDP message needs to contain a reason for delaying powering off and a required shutdown time, for example, the reply TLV shown in FIG. 4, and reference may be made to the description of the reply TLV in S220 for details, and the description thereof will not be repeated here.

If the reply information is powering off normally, the LLDP message may contain a process name and a process remaining time of the current task.

Through different second LLDP messages, the PSE may accurately learn the requirements of the PD and make different processing to avoid unnecessary data and device damages.

At S540, the second LLDP message is sent to the PSE.

After generating the second LLDP message, the second LLDP message is sent to the PSE. The PSE powers off the PD according to different second LLDP messages to ensure that the PD is powered off in a safe state.

It can be seen that in the embodiments of the present application, the first LLDP message sent by the PSE is received. The reply information of the PD is determined according to the first LLDP message and the process information of the currently executed task of the PD. The second LLDP message is generated according to the reply information. The second LLDP message is sent to the PSE, whereby the PSE powers off the PD according to the second LLDP message. Therefore, the present application can avoid the interruption of the current tasks of the PD as much as possible, thereby ensuring the security of data and the device.

As one implementation, determining the reply information of the PD according to the first LLDP message and the process information of the currently executed task of the PD includes:

determining that the reply information of the PD is delaying powering off when a predetermined time in the power-off TLV is less than the process remaining time.

The first LLDP message includes a power-off TLV, and it can be seen from FIG. 3 that the predetermined time for the PSE to stop supplying power to the PD may be acquired through the power-off TLV.

If the predetermined time in the power-down TLV is less than the process remaining time, it is indicated that the PD cannot complete the currently executed task within the predetermined time, and it is necessary to apply to the PSE for delaying powering off and determine that the current reply information of the PD is delaying powering off.

As one implementation, in the case to delay powering off the PD, a method for generating the second LLDP message includes:

acquiring shutdown delay information and required shutdown time of delaying powering off the PD; and generating the second LLDP message according to the shutdown delay information and the required shutdown time.

The required shutdown time is the time required for the PD to complete the currently executed task and shut down normally, and the shutdown delay information includes a reason for delaying shutting down the PD. The required shutdown time may be set based on the process remaining time. The process remaining time may be determined as the required shutdown time, or a preset value may be added on the basis of the process remaining time as the required shutdown time to reserve time for subsequent actions such as saving data and closing important files of the PD.

The second LLDP message is in a TLV format. An attribute type of the TLV format is first defined as a reply type, then a length value of the content of a data byte is set, and the shutdown delay information and the required shutdown time are filled in a position corresponding to the data byte to obtain the second LLDP message.

As one implementation, it is determined that the reply information of the PD is powering off normally when the predetermined time in the power-off TLV is greater than the process remaining time.

When the predetermined time in the power-off TLV is greater than the process remaining time, it is indicated that the PD may complete the currently executed task within the predetermined time, without applying to the PSE for delaying powering off, and it is determined that the current reply information of the PD is powering off normally.

As one implementation, in the case to power off the PD normally, a method for generating the second LLDP message includes:

generating the second LLDP message according to the process name and the process remaining time.

The attribute type of the TLV format of the second LLDP message is first defined as the reply type, then the length value of the content of the data byte is set, and a mark representing powering off normally is added to the process name. The mark may be a symbol, a letter, or a combination of the two. The marked process name and the process remaining time are filled in a position corresponding to the data byte to obtain the second LLDP message.

The difference of the second LLDP messages generated by the PD under two cases of delaying powering off and powering off normally lies in the content corresponding to the data byte. The position of the shutdown delay information in the second LLDP message generated under delaying powering off corresponds to the position of the marked process name in the second LLDP message generated under powering off normally, and the position of the required shutdown time corresponds to the position of the process remaining time.

As one implementation, the method further includes: saving power-off reason information in the first LLDP message after receiving the first LLDP message sent by the PSE.

The power-off reason information is a power-off reason field recorded by the data byte of the power-off TLV in the first LLDP message. After receiving the first LLDP message sent by the PSE, the power-off reason information may be saved while replying to the first LLDP message, or the power-off reason information may be saved after replying to the first LLDP message. Tracing is facilitated by recording the power-off reasons, which is helpful to maintain the normal operation of the device and ensure the stability of the device.

After saving the power-off reason information, the PD continues to complete the currently executed task. After completing the currently executed task, a shutdown procedure is performed. Thereafter, whenever the PSE stops supplying power to the PD, the PD is not affected, thereby ensuring the security of data and the device.

It is to be understood that, although the various steps in the flowcharts of FIGS. 2 and 5 are shown sequentially as indicated by the arrows, these steps are not necessarily performed sequentially in the order indicated by the arrows. These steps are performed in no strict order unless explicitly stated in the present application, and these steps may be performed in other orders. Moreover, at least some of the steps in FIGS. 2 and 5 may include multiple sub-steps or stages that are not necessarily performed at the same time, but may be performed at different times, and the order in which these sub-steps or stages are performed is not necessarily sequential, but may be performed in turn or in alternation with other steps or at least some of the sub-steps or stages of other steps.

Figure 6:
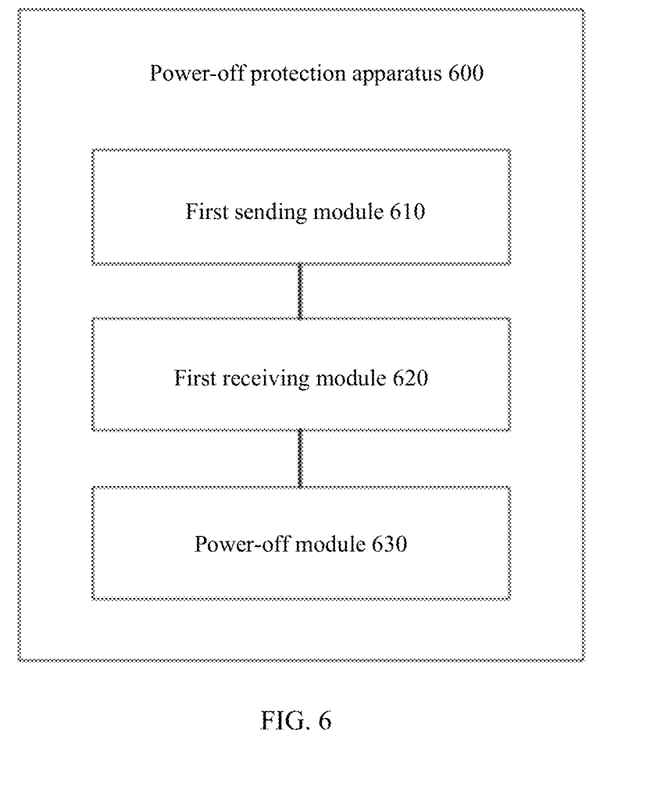
FIG. 6 is a block diagram of a structure of a power-off protection apparatus according to an embodiment.

FIG. 6 is a schematic structural diagram of a power-off protection apparatus 600 provided by an embodiment of the present application. The apparatus may be provided in the PSE 120 in the system shown in FIG. 1 to perform the method flow shown in FIG. 2. As shown in FIG. 6, the apparatus may include: a first sending module 610, a first receiving module 620, and a power-off module 630, and may further include: a determination module and a starting module. The main functions of the component modules are as follows.

The first sending module 610 is configured to in response to the PSE being about to stop supplying power to a PD within a predetermined time, send a first LLDP message to the PD.

The first receiving module 620 is configured to receive a second LLDP message, which is replied by the PD according to the first LLDP message.

The power-off module 630 is configured to power off the PD according to the second LLDP message.

As one implementation, the second LLDP message includes a required shutdown time and shutdown delay information of the PD. The power-off module 630 is specifically configured to:

determine whether to delay powering off the PD according to the shutdown delay information; and power off the PD according to the required shutdown time when it is determined to delay powering off the PD.

As one implementation, the module further includes the determination module, configured to:

determine whether to delay powering off the PD by matching the shutdown delay information with pre-stored shutdown information.

As one implementation, the pre-stored shutdown information includes multiple pieces of delay information and non-delay information. The determination module is specifically configured to:

if the shutdown delay information matches at least one piece of delay information in the pre-stored shutdown information, determine to delay powering off the PD;

if the shutdown delay information matches at least one piece of non-delay information in the pre-stored shutdown information, determine to power off the PD in advance; and if the shutdown delay information does not match any delay information and non-delay information in the pre-stored shutdown information, determine to power off the PD normally.

As one implementation, the apparatus further includes the starting module, configured to:
start a default time timer to time the predetermined time for the PSE to stop supplying power to the PD after sending the first LLDP message to the PD.

As one implementation, the power-off module 630 is specifically configured to:
turn off the default time timer to stop timing the predetermined time; and
start a delay time timer, and after the required shutdown time has elapsed, stop the delay time timer, and power off the PD.

As one implementation, the power-off module 630 is specifically configured to:
when it is determined to power off the PD normally, after the predetermined time has elapsed, stop the default time timer, and power off the PD.

As one implementation, the first LLDP message includes a power-off TLV.

As one implementation, the PSE includes a switch.

Figure 7:
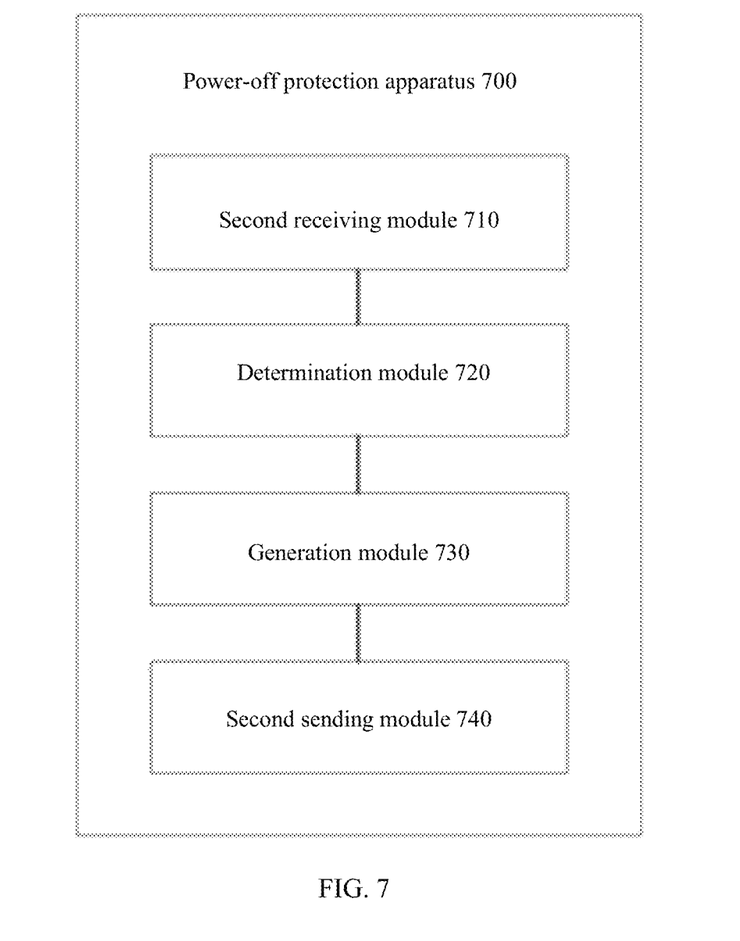
FIG. 7 is a block diagram of a structure of a power-off protection apparatus according to another embodiment.

FIG. 7 is a schematic structural diagram of a power-off protection apparatus 700 provided by an embodiment of the present application. The apparatus may be provided in the PD 130 in the system shown in FIG. 1 to perform the method flow shown in FIG. 5. As shown in FIG. 7, the apparatus may include: a second receiving module 710, a determination module 720, a generation module 730, and a second sending module 740, and may further include: a saving module. The main functions of the component modules are as follows.

The second receiving module 710 is configured to receive a first LLDP message sent by PSE, where the first LLDP message is used for informing the PD that the PSE stops supplying power to the PD within a predetermined time.

The determination module 720 is configured to determine reply information of the PD according to the first LLDP message and process information of a currently executed task of the PD.

The generation module 730 is configured to generate a second LLDP message according to the reply information.

The second sending module 740 is configured to send the second LLDP message to the PSE, whereby the PSE powers off the PD according to the second LLDP message.

As one implementation, the first LLDP message includes a power-off TLV, and process information includes a process remaining time. The determination module 720 is specifically configured to:
determine that the reply information of the PD is delaying powering off when a predetermined time in the power-off TLV is less than the process remaining time.

As one implementation, the generation module 730 is specifically configured to:
acquire shutdown delay information and required shutdown time of delaying powering off the PD; and
generate the second LLDP message according to the shutdown delay information and the required shutdown time.

As one implementation, the determination module 720 is specifically configured to:
determine that the reply information of the PD is powering off normally when the predetermined time in the power-off TLV is greater than the process remaining time.

As one implementation, the process information further includes a process name. The generation module 730 is specifically configured to:
generate the second LLDP message according to the process name and the process remaining time when the PD is normally powered off.

As one implementation, the apparatus further includes the saving module, configured to:
save power-off reason information in the first LLDP message after receiving the first LLDP message sent by the PSE.

The identical and similar parts between the above embodiments can refer to each other, and each embodiment focuses on the differences from other embodiments. In particular, with respect to the apparatus embodiment, which is substantially similar to the method embodiment, the description is relatively simple with reference to the description of the method embodiment.

According to the embodiments of the present application, the present application also provides a computer device and a non-volatile computer-readable storage medium.

Figure 8:
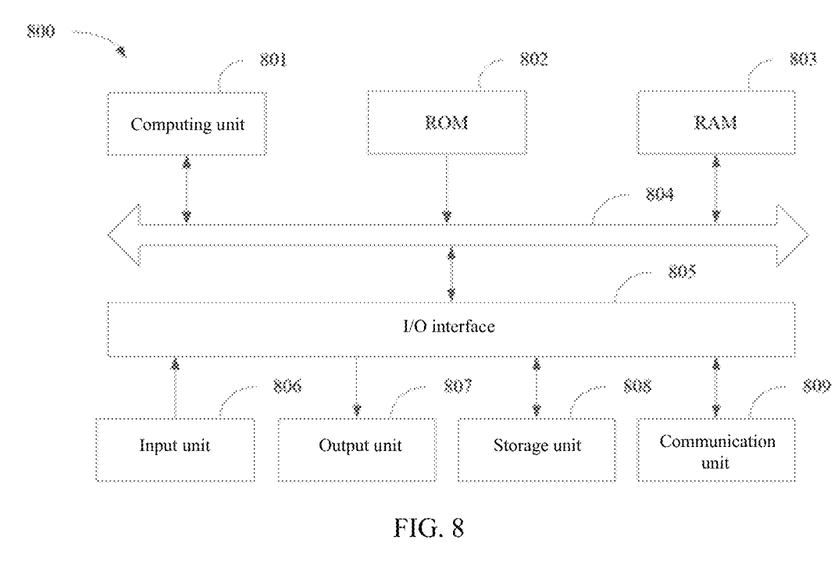
FIG. 8 is a schematic structural diagram of a computer device according to an embodiment.

FIG. 8 is a block diagram of a computer device according to an embodiment of the present application. The computer device is intended to represent various forms of digital computers or mobile apparatuses. The digital computers may include desktop computers, portable computers, workstations, personal digital assistants, servers, mainframe computers, and other suitable computers. The mobile apparatuses may include tablets, smart phones, and wearable devices.

As shown in FIG. 8, a device 800 includes a computing unit 801, a read only memory (ROM) 802, a random access memory (RAM) 803, a bus 804, and an input/output (I/O) interface 805. The computing unit 801, the ROM 802, and the RAM 803 are connected to each other through the bus 804. The I/O interface 805 is also connected to the bus 804.

The computing unit 801 may perform various processes in the method embodiments of the present application according to computer instructions stored in the ROM 802 or computer instructions loaded from a storage unit 808 into the RAM 803. The computing unit 801 may be various general and/or dedicated processing components with processing and computing capabilities. The computing unit 801 may include, but is not limited to, a central processing unit (CPU), a graphics processing unit (GPU), various dedicated artificial intelligence (AI) computing chips, various computing units running machine learning model algorithms, a digital signal processor (DSP), and any suitable processor, a controller, and a microcontroller. In some embodiments, methods provided by the embodiments of the present application may be implemented as a computer software program tangibly contained in the non-volatile computer-readable storage medium, such as the storage unit 808.

The RAM 803 may also store various programs and data required for the operation of the device 800. Some or all of the computer programs may be loaded and/or installed on the device 800 via the ROM 802 and/or a communication unit 809.

An input unit 806, an output unit 807, the storage unit 808, and the communication unit 809 in the device 800 may be connected to the I/O interface 805. The input unit 806 may be, for example, a keyboard, a mouse, a touch screen, and a microphone. The output unit 807 may be, for example, a display, a speaker, and an indicator light. The device 800 can exchange information, data, etc., with other devices through the communication unit 809.

It is to be noted that the device may also include other components necessary for proper operation. The device may also include only the components necessary to implement the solution of the present application and not necessarily include all the components shown in the drawings.

Various implementations of the systems and techniques described herein may be implemented in a digital electronic circuit system, an integrated circuit system, a field programmable gate array (FPGA), an application specific integrated circuit (ASIC), an application specific standard product (ASSP), a system on chip (SOC), a load programmable logic device (CPLD), computer hardware, firmware, software, and/or combinations thereof.

The computer instructions for implementing the methods of the present application may be written in any combination of one or more programming languages. These computer instructions may be provided to the computing unit 801 so that the computer instructions, when executed by the computing unit 801, such as the processor, cause the steps involved in method embodiments of the present application to be performed.

The non-volatile computer-readable storage medium provided by the present application may be a tangible medium that may contain or store computer instructions for performing the steps involved in method embodiments of the present application. The non-volatile computer-readable storage medium may include, but is not limited to, electronic, magnetic, optical, electromagnetic, and other forms of storage media.

The above-mentioned specific implementations do not constitute a limitation on the scope of the present application. It is to be appreciated by a person skilled in the art that various modifications, combinations, sub-combinations, and substitutions may be made according to design requirements and other factors. Any modifications, equivalents, improvements, etc. made within the spirit and principles of the present application shall be included within the scope of the present application.

What is claimed is:

1. A power-off protection method, being applied to power sourcing equipment (PSE), comprising:
   in response to the PSE being about to stop supplying power to a power device (PD) within a predetermined time, sending a first link layer discovery protocol (LLDP) message to the PD, wherein the first LLDP message comprises a power-off type length value (TLV);
   receiving a second LLDP message, which is replied by the PD according to the first LLDP message, wherein the second LLDP message comprises a delayed power off reply message which is determined when the predetermined time in the power-off type length value is less than a process remaining time of a currently executed task of the PD; and
   powering off the PD according to the second LLDP message.

2. The method according to claim 1, wherein the second LLDP message comprises a required shutdown time and shutdown delay information of the PD; the powering off the PD according to the second LLDP message comprises:
   determining whether to delay powering off the PD according to the shutdown delay information; and
   powering off the PD according to the required shutdown time when it is determined to delay powering off the PD.

3. The method according to claim 2, wherein the determining whether to delay powering off the PD according to the shutdown delay information comprises:
   determining whether to delay powering off the PD by matching the shutdown delay information with pre-stored shutdown information.

4. The method according to claim 3, wherein the pre-stored shutdown information comprises multiple pieces of delay information and non-delay information; the determining whether to delay powering off the PD by matching the shutdown delay information with pre-stored shutdown information comprises:
   if the shutdown delay information matches at least one piece of delay information in the pre-stored shutdown information, determining to delay powering off the PD;
   if the shutdown delay information matches at least one piece of non-delay information in the pre-stored shutdown information, determining to power off the PD in advance; and
   if the shutdown delay information does not match any delay information and non-delay information in the pre-stored shutdown information, determining to power off the PD normally.

5. The method according to claim 2, further comprising:
   starting a default time timer to time the predetermined time for the PSE to stop supplying power to the PD after sending the first LLDP message to the PD.

6. The method according to claim 5, wherein the powering off the PD according to the required shutdown time comprises:
   turning off the default time timer to stop timing the predetermined time; and
   starting a delay time timer, and after the required shutdown time has elapsed, stopping the delay time timer, and powering off the PD.

7. The method according to claim 5, further comprising:
   when it is determined to power off the PD normally, after the predetermined time has elapsed, stopping the default time timer, and powering off the PD.

8. The method according to claim 1, wherein the in response to the PSE being about to stop supplying power to a PD within a predetermined time, sending a first LLDP message to the PD comprises:
   in response to the PSE being actively about to stop supplying power to the PD within the predetermined time, acquiring mapping information between ports of the PSE and the PD; and
   sending the first LLDP message to a PD corresponding to a port with a lowest priority based on a preset port priority and the mapping information.

9. The method according to claim 8, wherein the PSE actively stopping supplying power to the PD within the predetermined time comprises:
   detecting power consumption amounts of at least one PD connected to the PSE; and
   the PSE actively stopping supplying power to the PD within the predetermined time when a sum of the power consumption amounts of the at least one PD is greater than a power supply amount of the PSE.

10. The method according to claim 1, wherein the in response to the PSE being about to stop supplying power to a PD within a predetermined time, sending a first LLDP message to the PD comprises:
    in response to the PSE stopping supplying power to the PD within the predetermined time according to a user instruction, acquiring mapping information between ports of the PSE and the PD; and sending the first LLDP message to a PD corresponding to a target port in the user instruction according to the mapping information.

11. The method according to claim 1 wherein the first LLDP message comprises a power-off type length value (TLV).

12. The method according to claim 1, wherein the PSE comprises a switch.

13. A power-off protection method, being applied to a power device (PD), the method comprising:
   receiving a first link layer discovery protocol (LLDP) message sent by power sourcing equipment (PSE), wherein the first LLDP message comprises a power-off type length value (TLV), which is used for informing the PD that the PSE stops supplying power to the PD within a predetermined time;
   determining reply information of the PD according to the first LLDP message and process information of a currently executed task of the PD by: determining that the reply information of the PD is delaying powering off when a predetermined time in the power-off type length value is less than a process remaining time, wherein the process information comprises the process remaining time;
   generating a second LLDP message according to the reply information; and
   sending the second LLDP message to the PSE, whereby the PSE powers off the PD according to the second LLDP message.

14. The method according to claim 13, wherein the generating a second LLDP message according to the reply information comprises:
   acquiring shutdown delay information and required shutdown time of delaying powering off the PD; and
   generating the second LLDP message according to the shutdown delay information and the required shutdown time.

15. The method according to claim 13, further comprising:
   determining that the reply information of the PD is powering off normally when the predetermined time in the power-off TLV is greater than the process remaining time.

16. The method according to claim 14, wherein the process information further comprises a process name; the generating a second LLDP message according to the reply information comprises:

generating the second LLDP message according to the process name and the process remaining time when the PD is normally powered off.

17. The method according to claim 13, further comprising:
   saving power-off reason information in the first LLDP message after receiving the first LLDP message sent by the PSE.

18. A computer device, characterized by comprising:
   at least one processor; and
   a memory communicatively connected to the at least one processor, wherein
   the memory stores computer instructions executable by the at least one processor, wherein the at least one processor, upon execution of the computer instructions, is configured to:
   in response to the PSE being about to stop supplying power to a power device (PD) within a predetermined time, send a first link layer discovery protocol (LLDP) message to the PD, wherein the first LLDP message comprises a power-off type length value (TLV);
   receive a second LLDP message, which is replied by the PD according to the first LLDP message, wherein the second LLDP message comprises a delayed power off reply message which is determined when the predetermined time in the power-off type length value is less than a process remaining time of a currently executed task of the PD; and
   power off the PD according to the second LLDP message.

19. The computer device according to claim 18, wherein the at least one processor, upon execution of the computer instructions, is further configured to:
   determine whether to delay powering off the PD according to the shutdown delay information; and
   power off the PD according to the required shutdown time when it is determined to delay powering off the PD.

20. The computer device according to claim 19, wherein the at least one processor, upon execution of the computer instructions, is further configured to:
   determine whether to delay powering off the PD by matching the shutdown delay information with pre-stored shutdown information.

* * * * *